United States Patent [19]
Garney et al.

[11] Patent Number: 5,890,015
[45] Date of Patent: Mar. 30, 1999

[54] METHOD AND APPARATUS FOR IMPLEMENTING A WIRELESS UNIVERSAL SERIAL BUS HOST CONTROLLER BY INTERFACING A UNIVERSAL SERIAL BUS HUB AS A UNIVERSAL SERIAL BUS DEVICE

[75] Inventors: John I. Garney, Aloha; T. Don Dennis, Beaverton, both of Oreg.

[73] Assignee: Intel Corporation, Santa Clara, Calif.

[21] Appl. No.: 772,141

[22] Filed: Dec. 20, 1996

[51] Int. Cl.[6] ................................................ G06F 13/00
[52] U.S. Cl. .......................... 395/882; 395/284; 395/286; 395/500
[58] Field of Search ............................. 395/200.83, 280, 395/500, 882, 306, 281, 286; 379/58

[56] References Cited

U.S. PATENT DOCUMENTS

| | | | |
|---|---|---|---|
| 5,353,331 | 10/1994 | Emery et al. .............................. | 379/58 |
| 5,404,453 | 4/1995 | Lutz et al. ................................ | 395/275 |
| 5,457,785 | 10/1995 | Kikinis et al. ........................... | 395/308 |
| 5,566,345 | 10/1996 | Ostrowaski .............................. | 395/822 |
| 5,621,898 | 4/1997 | Wooten ................................... | 395/297 |
| 5,632,021 | 5/1997 | Jennings et al. ........................ | 395/309 |
| 5,689,725 | 11/1997 | Eneboe et al. .......................... | 395/825 |
| 5,696,949 | 12/1997 | Young ..................................... | 395/551 |
| 5,717,737 | 2/1998 | Doviak et al. ........................... | 379/58 |

*Primary Examiner*—Thomas C. Lee
*Assistant Examiner*—Albert Wang
*Attorney, Agent, or Firm*—Blakely, Sokoloff, Taylor & Zafman LLP

[57] ABSTRACT

A Universal Serial Bus (USB) system is disclosed. The USB system includes a first host controller. A hub is coupled to the first host controller. A second host controller interfaces with the hub as a USB device. In one embodiment of the USB system, the second host controller is a wireless host controller. The second host controller includes a wireless system side module coupled to the hub and a wireless remote module containing host controller circuitry that receives signals from the wireless system side module. A method for interfacing a hub to a USB system is disclosed. A hub is coupled to a first host controller. The first host controller is coupled to a second hub connected to a second host controller that resides inside the computer.

14 Claims, 7 Drawing Sheets

METHOD AND APPARATUS FOR IMPLEMENTING A WIRELESS UNIVERSAL SERIAL BUS HOST CONTROLLER BY INTERFACING A UNIVERSAL SERIAL BUS HUB AS A UNIVERSAL SERIAL BUS DEVICE

FIELD OF THE INVENTION

The present invention pertains to the field of wireless, remote peripherals for computer systems. More specifically, the present invention relates to an apparatus and method for configuring a wireless module onto a Universal Serial Bus (USB) system for attaching USB devices.

BACKGROUND OF THE INVENTION

Figure 1:
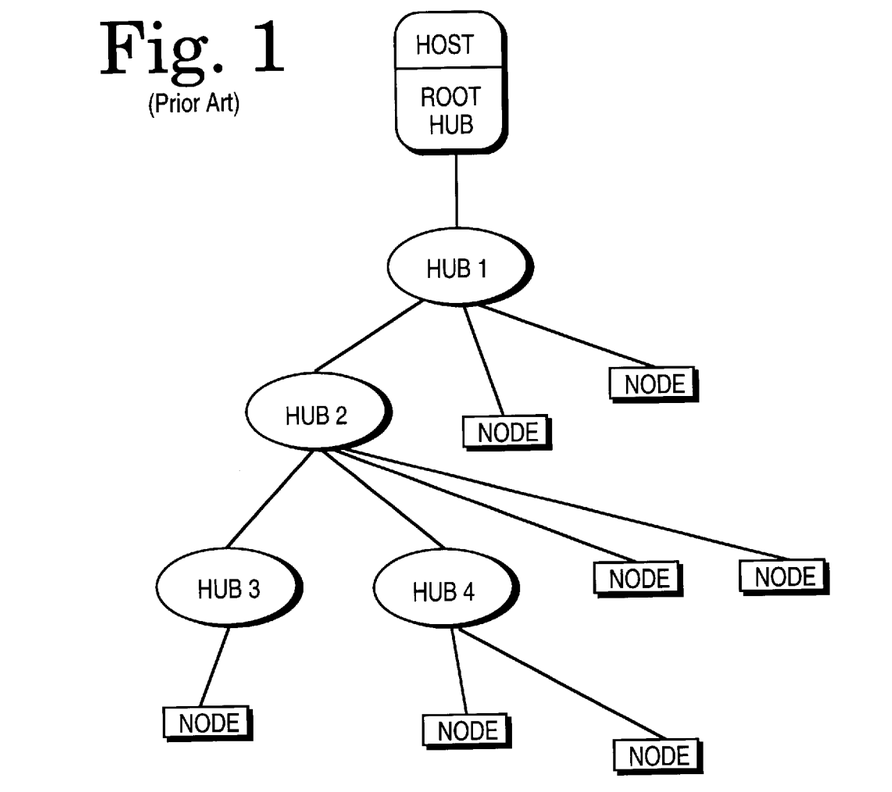
FIG. 1 illustrates the topology of the Universal Serial Bus.

The USB is a cable bus that supports data exchange between a host computer (USB host) and a wide range of simultaneously accessible peripherals (USB devices). The USB physical interconnect is a tiered star topology. A hub is at the center of each star. Each wire segment is a point-to-point connection between the USB host and a hub or a USB device, or a hub connected to another hub or USB device. FIG. 1 illustrates the topology of the USB.

The USB host contains host controllers that provide access to the USB devices in the system. The host controller performs several duties with regard to the USB and its attached USB devices. These duties include reporting and managing the states of the USB devices, converting protocol and data information between a native format and a bit stream transmitted on the USB, frame generation, processing requests for data transmission, and transmission error handling. The USB specification requires that a round trip response time delay for transmissions between a host controller and a USB device be within a specified time of 18 bit times. All transmissions on the USB are performed as packets within a transaction. A USB device must receive a transmission of a packet from the host controller and send a response packet back to the host controller within a specified time. This specified time only applies to packets within the transaction. This allows the USB system to preserve timing on the bus at the 12 Mbs rate and to support USB devices having real time requirements. A host controller expecting a response to a transaction will invalidate the transaction if it does not see a start of packet transition (SOP) within the time-out period after the end of the first packet's transmission.

The round trip response time delay requirements for USB systems make it difficult to implement a wireless link for configuring a wireless module onto a USB system. Additional time is required for transforming wire data through a transceiver to wireless data, transmitting the wireless data between a system side module and a remote module, and transforming the wireless data back to wire data. Current technologies for transmitting wireless signals such as infrared signals, radio signals, ultrasonic wave signals, and other aerial propagation signals do not provide the adequate bandwidth for transmitting data signals on the USB while complying with the round trip response time delay requirement.

Thus, what is needed is a method and apparatus for configuring a wireless module for connecting USB devices onto a USB system implementing the current technologies for transmitting wireless signals.

SUMMARY OF THE INVENTION

A Universal Serial Bus (USB) system is disclosed. The USB system includes a first host controller. A hub is coupled to the first host controller. A second host controller interfaces with the hub as a USB device. In one embodiment of the USB system, the second host controller is a wireless host controller. The second host controller includes a wireless system side module coupled to the hub and a wireless remote module containing host controller circuitry that receives signals from the wireless system side module.

A USB system is disclosed. The USB system includes a host residing inside a computer housing. A first host controller resides outside of the computer housing. In one embodiment of the USB system, the first host controller communicates with the host via a wireless communication system.

A method for interfacing a hub to a USB system is disclosed. A hub is coupled to a first host controller. The first host controller interfaces with a second hub connected to a second host controller inside a USB host.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 2:
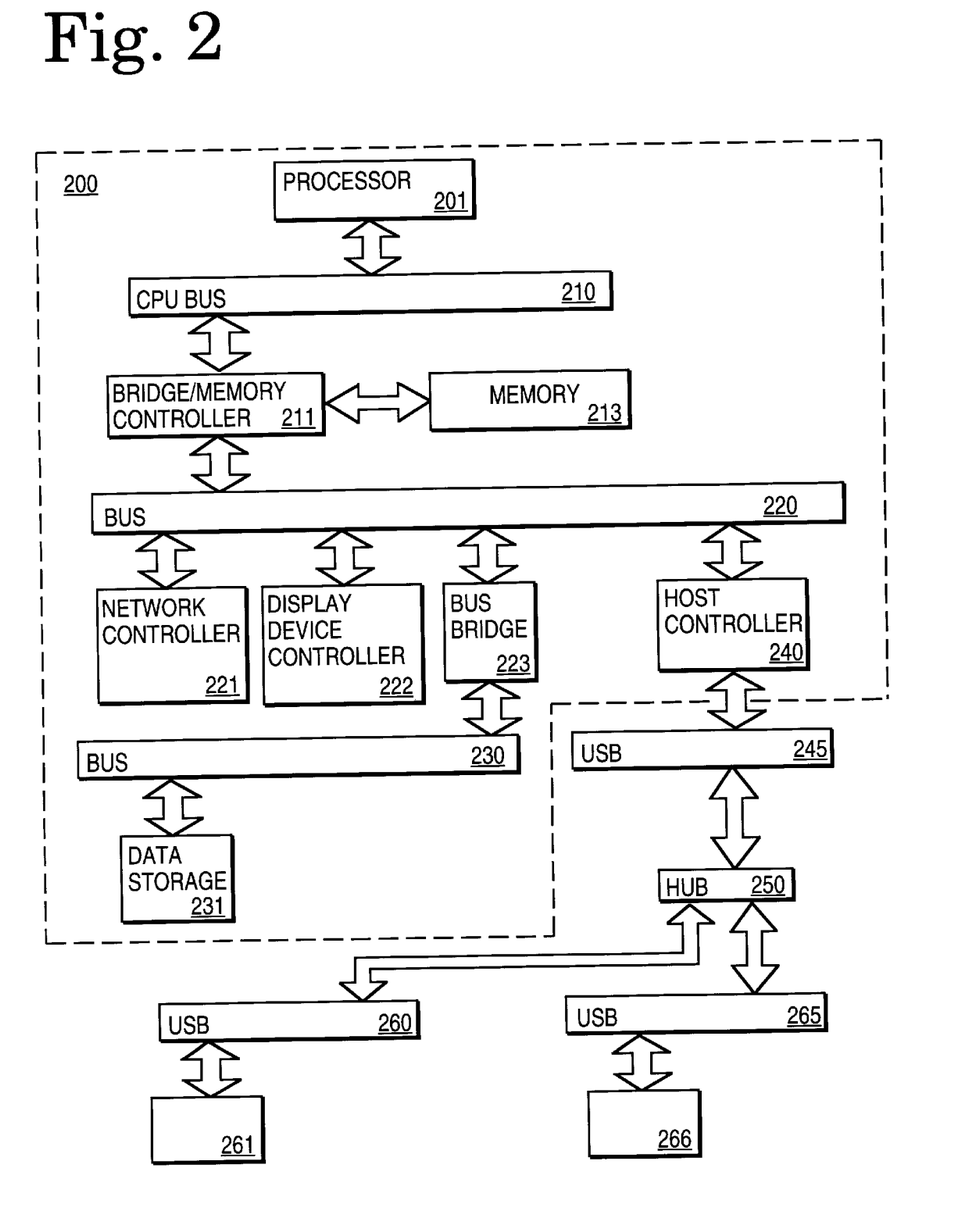
FIG. 2 illustrates a block diagram of a computer system implementing one embodiment of the present invention.

Referring to FIG. 2, an exemplary computer system upon which an embodiment of the present invention can be implemented is shown as 200. The computer system 200 operates as a USB host. The USB host 200 comprises a processor 201 that processes digital data. The processor 201 can be a complex instruction set computing (CISC) microprocessor, a reduced instruction set computing (RISC) microprocessor, a very long instruction word (VLIW) microprocessor, a processor implementing a combination of instruction sets, or other processor device. The processor 201 is coupled to a CPU bus 210 which transmits signals between the processor 201 and other components in the USB host 200.

For the illustrated embodiment, a memory 213 comprises a dynamic random access memory (DRAM) device, a static random access memory (SRAM) device, or other memory devices. The memory 213 stores information or other intermediate data during execution by the processor 201. A bridge memory controller 211 is coupled to the CPU bus 210 and the memory 213. The bridge memory controller 211 directs data traffic between the processor 201, the memory 213, and other components in the USB host 200 and bridges signals from these components to a high speed I/O bus 220.

For the illustrated embodiment, the high speed I/O bus 220 supports peripherals operating at high data throughput rates. The bus 220 can be a single bus or a combination of multiple buses. As an example, the bus 220 can comprise a Peripheral Components Interconnect (PCI) bus, a Personal Computer Memory Card International Association (PCMCIA) bus, or other buses. The bus 220 provides communication links between components in the USB host 200. A network controller 221 links a network of computers together and provides communication among the machines. A display device controller 222 is coupled to the high speed I/O bus 220. The display device controller 222 allows coupling of a display device to the computer system and acts as an interface between the display device and the USB host 200. The display device receives information and data from the processor 201 through the display device controller 222 and displays the information and data to the user of the USB host 200.

In the illustrated embodiment, a bus bridge 223 couples the high speed I/O bus 220 to I/O bus 230. The bus bridge 223 comprises a translator to bridge signals between the high speed I/O bus 220 and the I/O bus 230. The I/O bus 230 is used for communicating information between peripheral device that operate at lower throughput rates. The I/O bus 230 can be a single bus or a combination of multiple buses. As an example, the bus 230 can comprise an Industry Standard Architecture (ISA) bus, an Extended Industry Standard Architecture (EISA) bus or a Micro Channel Architecture (MCA) bus. The bus 230 provides communication links between components in the computer system 110. A data storage device 231 can be a hard disk drive, a floppy disk drive, a CD-ROM device, a flash memory device or other mass storage device.

USB 245 is a cable bus that supports data exchange between the USB host 200 and a wide range of simultaneously accessible peripherals or USB devices. Host controller 240 interfaces the USB host 200 with the USB 245. The host controller 240 performs several duties. The host controller 240 reports and manages the states of the USB 245. For data transmitted from the USB host 200, the host controller 240 converts protocol and data information from its native format to a bit stream transmitted on the USB 245. For data received into the host, the host controller 240 converts the bit stream of protocol and data information on the USB to the host's native format. The host controller 240 partitions USB time by issuing Start of Frame (SOF) tokens. The host controller 240 processes requests for data transmission to and from the USB host 200 and supports the protocol specified by the USB 245. The host controller 240 also detects and handles transmission errors.

A USB hub 250 is coupled to the USB 245. The USB hub 250 is a device that operates to provide additional connections to the USB 245. The USB hub 250 includes a repeater unit that manages connectivity on a per packet basis and a hub controller that provides status and control and permits host access to the USB hub 250. USB components 261 and 266 are connected to the USB 245 via USB 260 and 265 and USB hub 250. In one embodiment of the present invention, USB components 261 and 266 are USB devices such as video cameras, audio speakers, keyboard controllers, audio controllers, or other devices. In an alternate embodiment of the present invention, USB components 261 and 266 are USB hubs used for connecting additional USB devices or hubs. The USB specification imposes a round trip response time delay for transmissions between a host controller and a USB device connected onto the USB. Referring to FIG. 2, USB devices 261 and 266 must receive a transmission from the host controller 240 and send an acknowledgment of the transmission back to the host controller 240 within the specified round trip response time delay of 18 bit times.

The present invention is related to the use of the USB host 200 to configure a wireless module onto the USB for connecting USB devices. According to one embodiment, configuring a wireless module is performed by USB host 200 in response to the processor 201 executing sequences of instructions contained in the memory 213. Such instructions may be read into the memory 213 from other computer-readable mediums such as data storage device 231. Execution of the sequences of instructions contained in the memory 213 causes the processor to configure a wireless module, as will be described hereafter. In alternative embodiments, hard-wired circuitry may be used in place of or in combination with software instructions to implement the present invention. Thus, the present invention is not limited to any specific combination of hardware circuitry and software.

Figure 3:
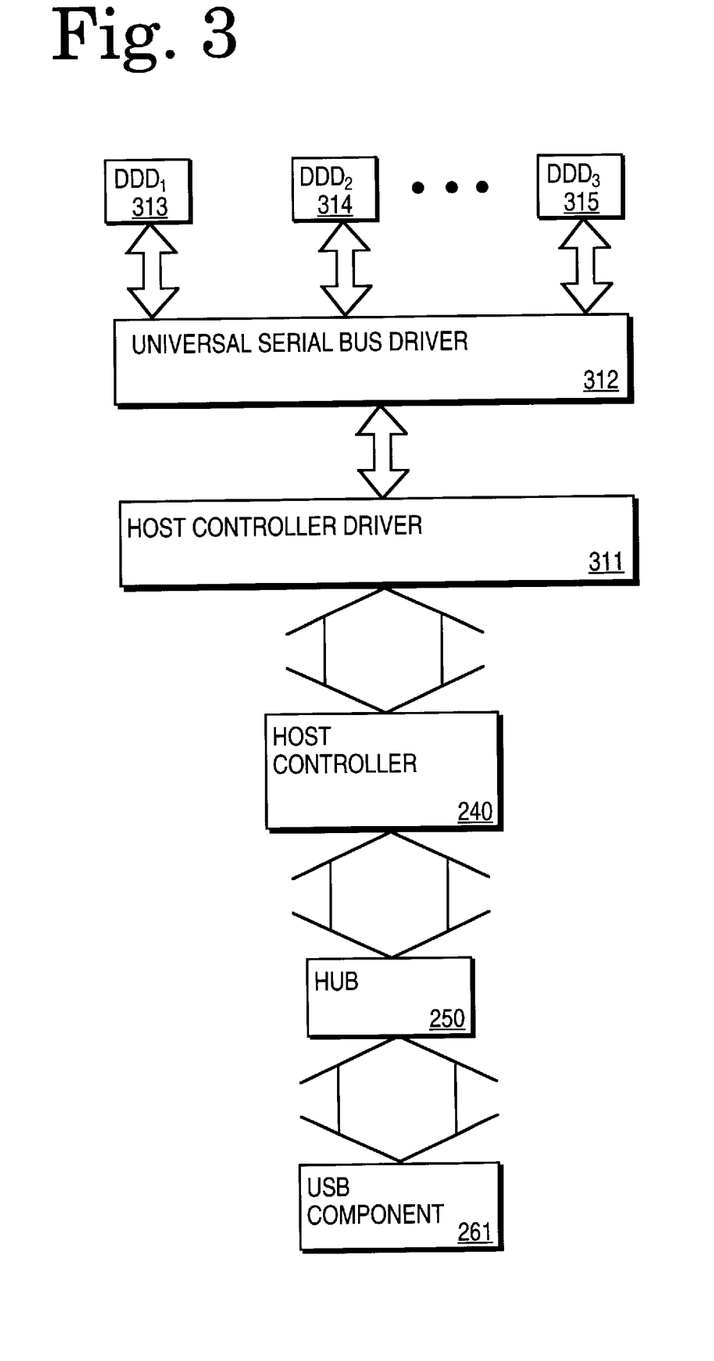
FIG. 3 illustrates a block diagram of the different software layers interfacing the host controller for the embodiment of the present invention illustrated in FIG. 2.

FIG. 3 illustrates a block diagram of the different layers of software interfacing with the host controller 240. There are three software layers that are responsible for managing the host controller 240. The first software layer is the Host Controller Driver (HCD) 311. The second software layer is the Universal Serial Bus Driver (USBD) 312. The USBD 312 is one layer above the HCD 311 with respect to the host controller 240. The third software layer includes device drivers 313–315. The device drivers 313–315 are one layer above the USBD 312 with respect to the host controller 240. The hub 250 and the USB component 261 are also illustrated in FIG. 3. The USBs that connect the hub 250 and the USB component 261 to the host controller 240 are not illustrated.

The HCD 311 is the layer of software that interfaces directly with the host controller 240. The HCD 311 is the lowest tier in the USB software stack and has only one client, the USBD 312. The HCD 311 performs several tasks. The HCD 311 provides an abstraction of the host controller 240, an abstraction for data transfers by the host controller 240 across the USB interconnect 245, and an abstraction for the allocation and deallocation of host controller resources to support guaranteed service to USB devices. The HCD 311 also presents the root hub and its behavior according to the hub class definition. This includes supporting the root hub such that the hub driver interacts with the root hub exactly as it would for any hub.

The USBD 311 interfaces with the HCD 311 and maps requests from its device driver clients 313–315 to an appropriate HCD when multiple HCD reside in the USB host 200. The USBD provides a collection of mechanisms that operating system components, such as the device drivers 313–315, use to access USB devices. The only access to USB devices is that provided by the USBD 312. The USBD 312 implementations are operating system specific. The mechanisms provided by the USBD 312 are implemented using as appropriate and augmenting as necessary the mechanisms provided by the operating system environment in which it runs. A single instance of the USBD 312 directs access to one or more HCDs that in turn connect to one or more USB host controllers. USBD instancing management is dependent upon the operating system environment.

Device drivers are programs that interface the USB host 200 to USB devices. A device driver of a USB device controls the USB device and allows the USB device to perform its function. Device drivers interface with the USBD 312 and communicate with the USB devices via the USBD 312. When a device driver wishes to access information from its corresponding USB device, the device driver sends a request to the USBD. The USBD determines the identity of the host controller connected to the USB device and forwards the request to that host controller's corresponding HCD. The HCD sends the request to its host controller and instructs the host controller to convert the request from its native format to a bit stream and transmit the request on the USB to the appropriate USB device. Although the HCD 311, USBD 312, and device drivers 313–315 are shown to be implemented in software, it should be appreciated that the HCD 311, USBD 312, and device drivers 313–315 may also be implemented in hardware or a combination of software and hardware.

Figure 4:
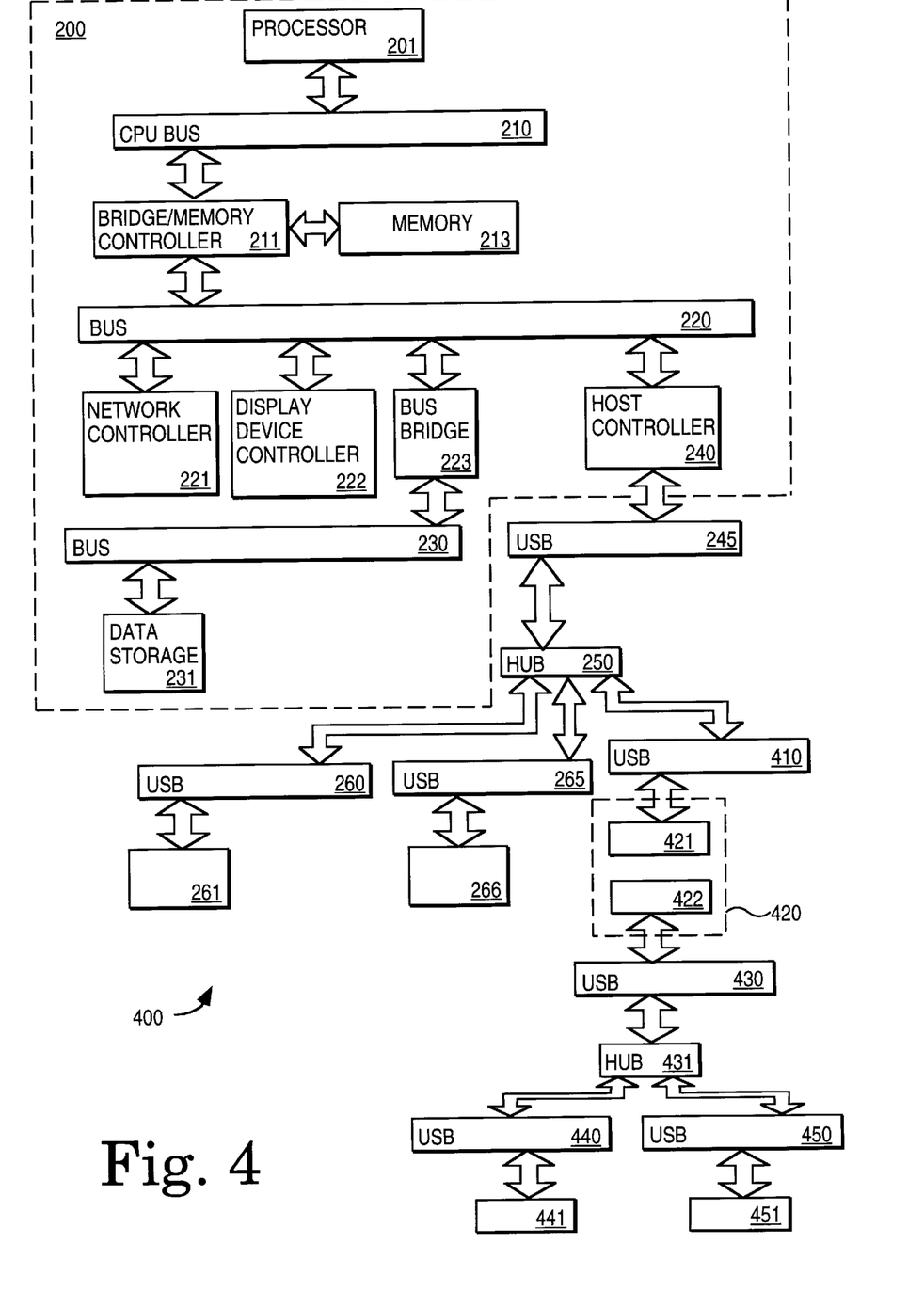
FIG. 4 illustrates a block diagram of a configuration of a Universal Serial Bus system with a remote hub according to one embodiment of the present invention.

FIG. 4 illustrates a block diagram of a USB system 400 configured with a wireless module according to one embodiment of the present invention. A second host controller 420 interfaces the USB host 200 as a USB device via hub 250 and USB connections 245 and 410. The second host controller 420 comprises a wireless system side module 421 and a wireless remote module 422. The wireless system side module 421 is connected to the hub 250 via USB 410. According to one embodiment of the present invention, the USB host 200 including the host controller 240 reside inside a computer housing. The hub 250 and the second host controller 420 reside outside of the computer housing.

Figure 5:
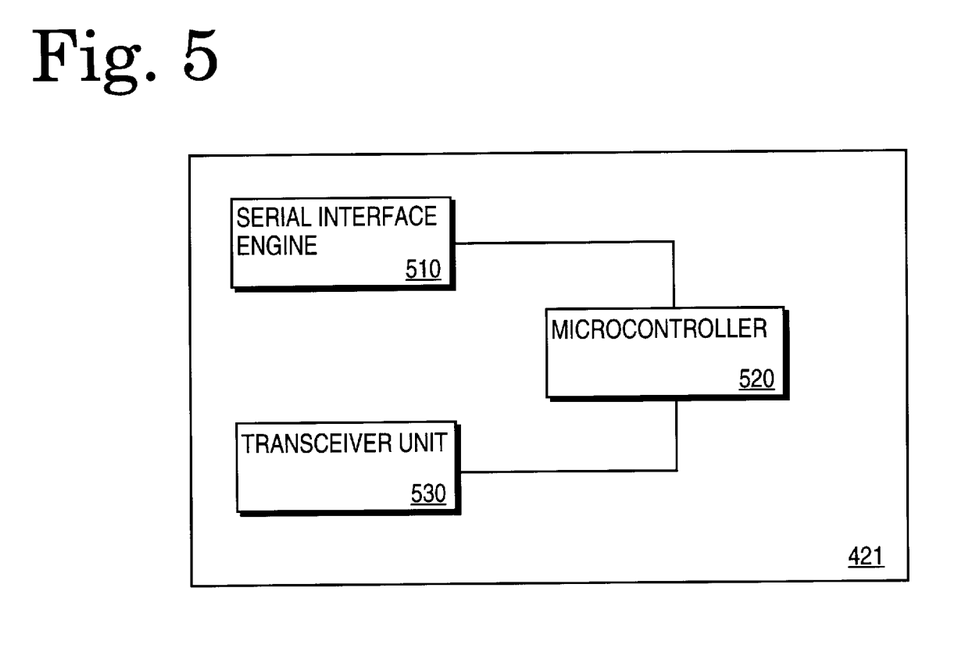
FIG. 5 illustrates a block diagram of a wireless system side module according to one embodiment of the present invention.

FIG. 5 illustrates one embodiment of the wireless system side module 421 according to the present invention. The wireless system side module 421 includes a serial interface engine (SIE) 510 that interfaces with the USB 410. The SIE 510 receives transmitted data from the USB host 200 and checks the data for errors. The wireless system side module 421 includes a transceiver unit 530. The transceiver unit 530 operates to transmit and receive data to and from a transceiver unit in wireless remote module 422. The wireless system side module 421 includes a microcontroller 520 coupled to the SIE 510 and the transceiver unit 530. The microcontroller 520 receives the data from the SIE 510 and the transceiver unit 530 and determines the direction to send the data. Upon receiving a transmission from the USB host 200, the microcontroller 520 sends an acknowledgment back to the USB host 200 via the SIE 510. The SIE 510, microcontroller 520, and transceiver unit 530 may be implemented by any known circuitry.

Figure 6:
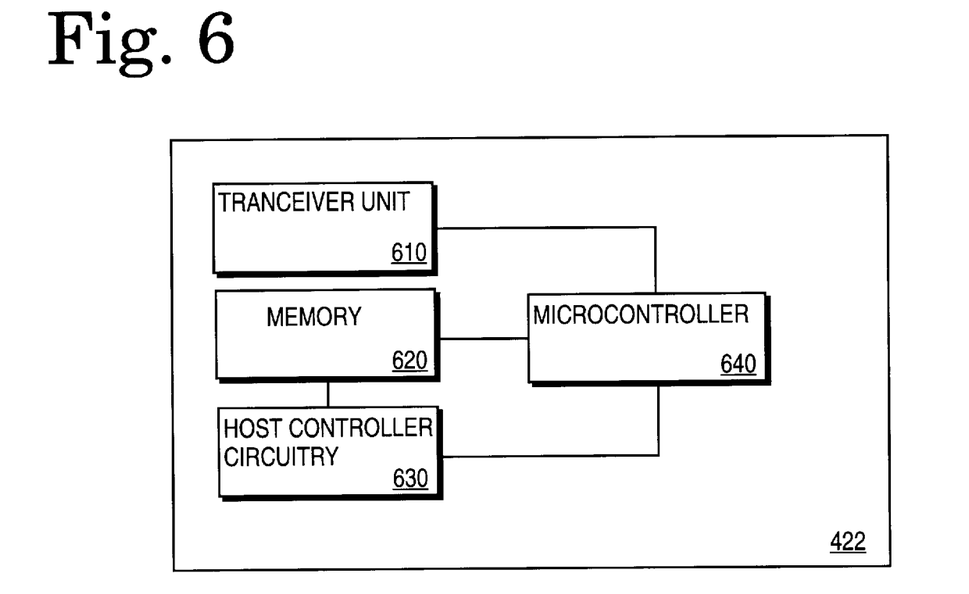
FIG. 6 illustrates a block diagram of a wireless remote module according to one embodiment of the present invention.

FIG. 6 illustrates one embodiment of the wireless remote module 422 according to the present invention. The wireless remote module 422 includes a transceiver unit 610. The transceiver unit 610 operates to transmit and receive data to and from a transceiver unit 530 in wireless system side module 421. The wireless remote module 422 includes host controller circuitry 630 that connects to the USB 430. The host controller circuitry 630 operates similarly to the circuitry in host controller 240 and allows the wireless remote module 422 to operate as a host controller. The wireless remote module 422 includes a microcontroller 640 coupled to the transceiver unit 610 and the host controller circuitry 630. The microcontroller 640 receives data from the transceiver unit 610 and the host controller circuitry 630 and determines the direction to send the data. The wireless remote module 422 also includes a memory 620. The memory 620 operates to store data received by the host controller circuitry 630 when the microcontroller is busy until the microcontroller 640 is ready to process the data. The transceiver unit 610, memory 620, host controller circuitry 630, and microcontroller 640 may be implemented by any known circuitry.

Referring back to FIG. 4, the wireless system side module 421 and the wireless remote module 422 provides a wireless second host controller that allows additional USB devices to communicate with the USB host 200. As shown, a USB hub 431 is coupled to the second host controller 420 via USB 430. The USB hub 431 is coupled to a USB device 441 via USB 440. According to the embodiment of the present invention shown in FIG. 4, users can connect peripherals such as a video monitor and input/output devices to a computer system at a remote location without having to directly connect the peripherals to the computer system using cables.

The configuration of the host controller 420 in FIG. 4 bounds the interpacket wire transmissions on the USB system 400 with the round trip response time delay requirement but not the wireless transmissions. The round trip response time delay requirement applies to transmissions between a host controller and the end device on the USB. Thus, the round trip response time delay requirement applies to transmissions between the host controller 240 and the wireless system side module 421 and transmissions between the wireless remote module 422 and the USB component 441. These transmissions are performed on a homogenous wire medium and may be completed at the bandwidth and rate required by the USB specification.

The wireless transmissions between the wireless system side module 421 and the wireless remote module 422 are not bounded by the round trip response time delay requirement. This allows the transceiver units 520 and 610 on the wireless system side module 421 and the wireless remote module 422 to transmit information between each other at an independent rate without violating the USB specification.

Figure 7:
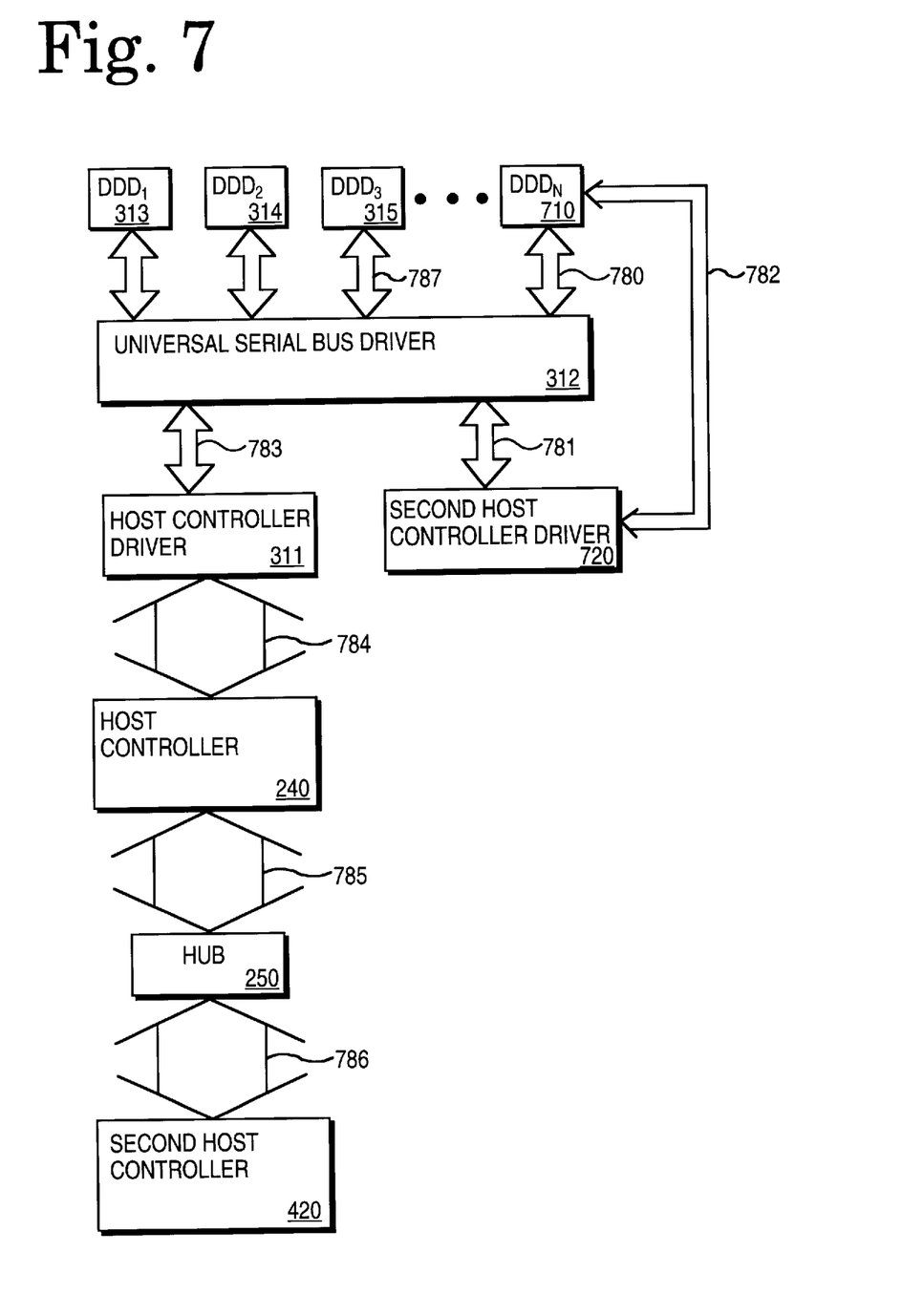
FIG. 7 illustrates a block diagram of the software layers interfacing the host controller for the embodiment of the present invention illustrated in FIG. 4.

FIG. 7 illustrates a block diagram of the software layers interfacing the host controller for the embodiment of the present invention illustrated in FIG. 4. HCD 311, USBD 312, and device drivers 313–315 operate to manage host controller 240 as described in FIG. 3. A second host controller driver (HCD2) 720, operates with HCD 311, USBD 312, and device driver 315 to manage the second host controller 420. When device driver 315 wishes to access information from its corresponding USB device 441, the device driver 315 sends a request to the USBD 312 via path 787. The USBD 312 determines that the identity of the host controller connected to the USB device 441 is the second host controller 420. The USBD 312 forwards the request to the second host controller's corresponding host controller driver, HCD2 720, via path 781. The HCD2 720 signals device driver 710 via path 782 to make a request to the USBD 312 via path 780 to access the second host controller 420 as a USB device. The USBD 312 determines that the second host controller 420 is attached as a USB device to the host controller 240 and forwards the request to the HCD 311 via path 783. The HCD 311 sends this request to its host controller 240 via path 784 and instructs the host controller 240 to convert the request from its native format to a bit stream and transmit the request to the second host controller 420 via the hub 250. The bit stream is transmitted from the host controller 240 to the hub 250 via path 785. The bit stream is transmitted from the hub 250 to the second host controller 420 via path 786. The second host controller 420 then transmits the request to the USB device 441 via the hub 431.

Figure 8:
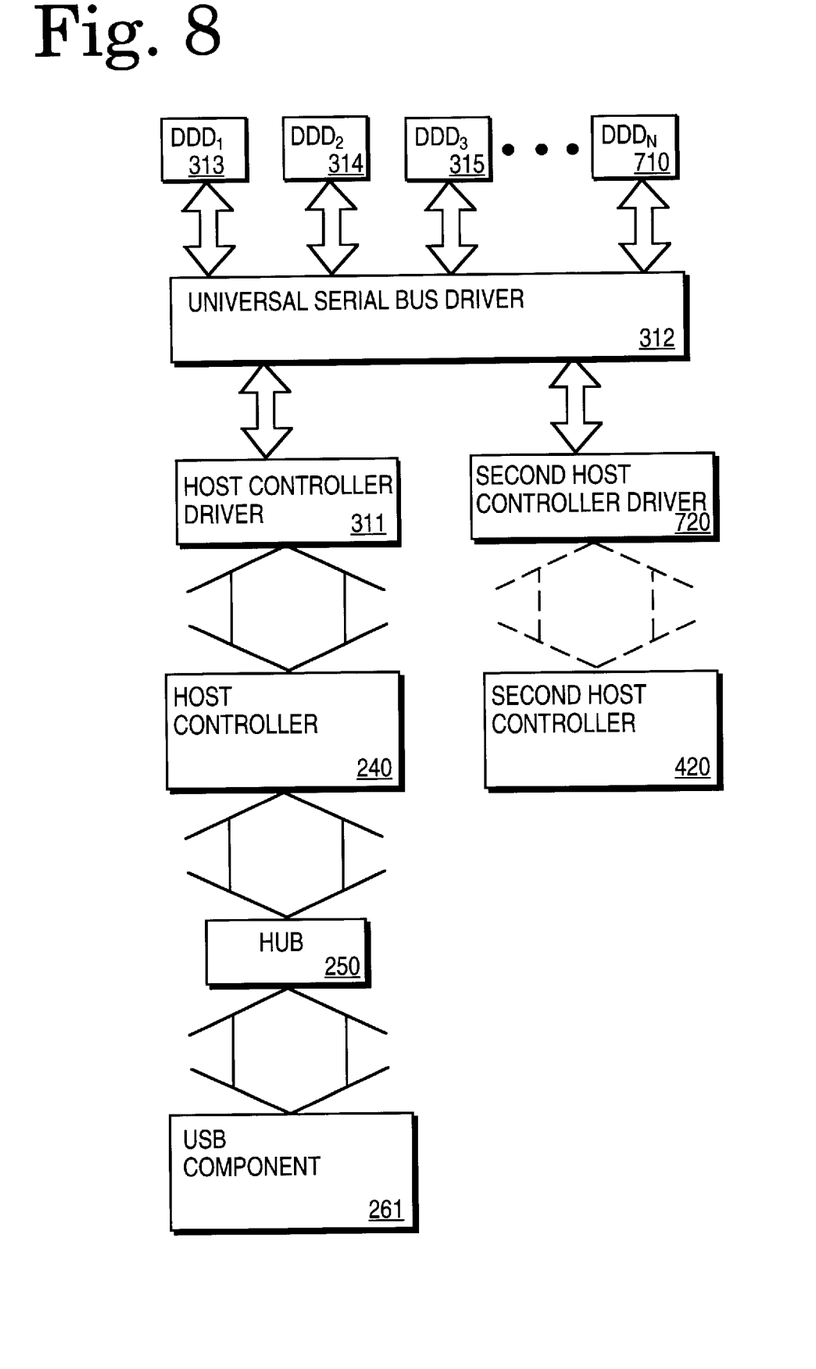
FIG. 8 is a block diagram illustrating how a host controller appears to the host from a data flow perspective, according to an embodiment of the present invention.

By configuring a custom host controller driver for the second host controller 420 that presents the wireless remote module 422 as if it was directly attached to the USB host 200, the second host controller 420 appears to the host 200 as a non-wireless USB host controller. FIG. 8 is a block diagram illustrating how the second host controller 420 appears to the host 200 from a data flow perspective. This allows the existing device drivers for USB devices at the remote hub to be preserved without requiring any special handling for supporting wireless USB devices.

In one embodiment of the present invention, the wireless system side module 421 makes use of USB defmed isochronous data pipes to provide low latency communication with the wireless remote module 422. The interactions between the USB host 200 and the wireless remote module 422 involve interchanging basic USB host controller information such as frame size adjustments, data for remote devices, and control/status information about existing and newly attached and detached remote USB peripherals.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than an restrictive sense.

What is claimed is:

1. A Universal Serial Bus (USB) system, comprising:
   a first host controller;
   a hub coupled to the first host controller;
   a wireless host controller interfacing the hub as a USB device that includes a wireless system side module coupled to the hub, and a wireless remote module containing host controller circuitry that receives signals from the wireless system side module.

2. The USB system of claim 1, further comprising a second hub coupled to the wireless host controller.

3. The USB system of claim 1, further comprising a first host controller driver that interfaces with the first host controller and manages the first host controller.

4. The USB system of claim 3, further comprising a USB driver that interfaces with the first host controller driver.

5. The USB system of claim 4, further comprising a wireless host controller driver that manages the wireless host controller, wherein the wireless host controller driver interfaces with the wireless host controller via the USB driver, the first host controller driver, the first host controller, and the hub.

6. A Universal Serial Bus System (USB), comprising:
   a USB host residing inside a computer housing; and
   a first host controller residing outside the computer housing that communicates with the USB host via a wireless communication system;
   a second host controller;
   a hub coupled to the second host controller;
   a wireless system side module coupled to the hub that interfaces with the hub as a USB device; and
   a wireless remote module that receives signals from the wireless system side module and that contains host controller circuitry.

7. The USB system of claim 6, further comprising a second host controller driver that interfaces with the second host controller and manages the second host controller.

8. The USB system of claim 7, further comprising a USB driver that interfaces with the second host controller driver.

9. The USB system of claim 8, further comprising a first host controller driver that manages the first host controller, wherein the first host controller driver interfaces with the first host controller via the USB driver, the second host controller driver, the second host controller, and the hub.

10. A computer system comprising:
    a bus;
    a processor coupled to the bus;
    a memory coupled to the bus;
    a first host controller coupled to the bus;
    a hub coupled to the first host controller; and
    a wireless host controller, interfacing with the hub as a Universal Serial Bus (USB) device, that includes a wireless system side module coupled to the hub, and a wireless remote module containing host controller circuitry that receives signals from the wireless system side module.

11. The system of claim 10 further comprising a second hub coupled to the wireless host controller.

12. The system of claim 10, further comprising a first host controller driver that interfaces with the first host controller and manages the first host controller.

13. The system of claim 12, further comprising a USB driver that interfaces with the first host controller driver.

14. The system of claim 13, further comprising a wireless host controller driver that manages the wireless host controller, wherein the wireless host controller driver interfaces with the wireless host controller via the USB driver, the first host controller driver, the first host controller, and the hub.

* * * * *

UNITED STATES PATENT AND TRADEMARK OFFICE
CERTIFICATE OF CORRECTION

PATENT NO.   :   5,890,015
DATED        :   March 30, 1999
INVENTOR(S)  :   Garney, et al.

It is certified that error appears in the above-identified patent and that said Letters Patent is hereby corrected as shown below:

In column 7 at line 10 delete "defmed" and insert -- defined --

Signed and Sealed this

Twenty-fifth Day of January, 2000

Attest:

Attesting Officer

*Acting Commissioner of Patents and Trademarks*